US007838594B2

(12) United States Patent
Teasley

(10) Patent No.: US 7,838,594 B2
(45) Date of Patent: *Nov. 23, 2010

(54) BRIDGED ARYLENE FLUORINATED SULFONIMIDE COMPOSITIONS AND POLYMERS

(75) Inventor: Mark F. Teasley, Landenberg, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 367 days.

This patent is subject to a terminal disclaimer.

(21) Appl. No.: 11/865,083

(22) Filed: Oct. 1, 2007

(65) Prior Publication Data

US 2009/0171067 A1 Jul. 2, 2009

Related U.S. Application Data

(60) Provisional application No. 60/849,404, filed on Oct. 4, 2006.

(51) Int. Cl.
*C08G 75/30* (2006.01)
*H01M 8/10* (2006.01)

(52) U.S. Cl. .......................... 524/717; 429/12; 528/377; 528/391; 528/7; 549/42; 549/46; 549/48; 549/4; 524/701

(58) Field of Classification Search ................. 524/717, 524/701; 429/12; 528/7, 377, 391; 549/4, 549/42, 46, 48

See application file for complete search history.

(56) References Cited

U.S. PATENT DOCUMENTS

| 3,664,915 | A | 5/1972 | Gore |
| 3,953,566 | A | 4/1976 | Gore |
| 3,962,153 | A | 6/1976 | Gore |
| 4,187,390 | A | 2/1980 | Gore |
| 5,547,551 | A | 8/1996 | Bahar et al. |
| 5,962,631 | A | 10/1999 | Woo et al. |
| 6,110,333 | A | 8/2000 | Spethmann et al. |
| 6,353,072 | B1 | 3/2002 | Towns et al. |
| 7,135,537 | B2 | 11/2006 | Hofmann |
| 2008/0177088 | A1 | 7/2008 | Teasley |

FOREIGN PATENT DOCUMENTS

| WO | WO 97/28129 A1 | 8/1997 |
| WO | WO 00/53656 A1 | 9/2000 |
| WO | WO 2005/001979 A2 | 1/2005 |

OTHER PUBLICATIONS

Wang et al., Direct Polymerization of Sulfonated Poly(Arylene Ether Sulfone) Random (Statistical) Copolymers: Candidates for New Proton Exchange Membranes, Journal of Membrane Science, 2002, vol. 197:231-242.
Yamamoto et al., Electrically Conducting and Thermally Stable Conjugated Poly (Arylene)s Prepared by Organometallic Processes, Progress in Polymer Science, 1992, vol. 17:1153-1205.
Ioyda et al., Homocoupling of Aryl Halides Using Nickel (ii) Complex ANF Zinc in the Presence of Et4NI. An Efficient Method for the Synthesis of Biaryls and Bipyridines, Bullentin of the Chemical Society of Japan, 1990, vol. 63:80-87.
Colon et al., High Molecular Weight Aromatic Polymers by Nickel Coupling of Aryl Polychlorides, Journal of Polymer Science, Part A, Polymer Chemistry Edition, 1990, vol. 28:367.
Miyaura et al., The Palladium-Catalyzed Cross-Coupling Reaction of Phenylboronic Acid With Haloarenes in the Presence of Bases, Synthetic Communication, 1981, vol. 11:513.
Wallow et al., Palladium-Mediated Poly(p-phenylene) Synthesis: Evidence for a Molecular Weight Limiting Phosphine Arylation Reaction, American Chemical Society, Polymer Preprint, 1993, vol. 34:1009.
H. Gilman et al., Relative Reactivities of Organometallic Compounds. XVIII. Selective Metalations of Dibenzothiophene, Journal of Organic Chemistry, 1938, vol. 3:120-124.
Gilman et al., Some Brominated Dibenzothiophene Derivatives, J. Am. Chem. Soc., 1953, vol. 75:3843-3845.

*Primary Examiner*—Kelechi C Egwim

(57) ABSTRACT

Aromatic sulfonimide ionene compositions useful as monomers for polymers in electrochemical cells are prepared.

19 Claims, No Drawings

BRIDGED ARYLENE FLUORINATED SULFONIMIDE COMPOSITIONS AND POLYMERS

FIELD OF INVENTION

Described herein are aromatic sulfonimide monomers and polymers useful as membranes in electrochemical cells.

BACKGROUND

Polymer electrolyte membrane fuel cells (PEMFC) are expected to provide higher efficiencies, fewer environmental pollutants, and reduced operating and maintenance costs than traditional power sources. An important component of a PEMFC is a polymer electrolyte membrane (PEM). The range of potential candidates for use as membrane materials in PEMFCs is limited by a number of requirements, including chemical, thermal, and mechanical stability, high ionic conductivity, and low reactant permeability. Developments have been made in the use of sulfonic acid functionalized polymers, including membranes such as Nafion® perfluorosulfonic acid membranes.

Known membranes made from sulfonic acid functionalized polymers have been found to have inadequate performance at temperatures greater than 100° C. due, in part, to the dependence of the membranes on water for proton conduction. Above 100° C., pressure constraints limit the amount of water that can be used to hydrate a membrane. At relatively low levels of humidity, insufficient water is present within the membrane to support the transport of protons. In addition to improved performance at higher temperatures, it is also desirable to have improved mechanical stability at such temperatures.

Alternatives to perfluorosulfonic acid membranes include membranes based on aromatic engineering polymers. For example, poly(arylene ether)s, poly(arylene ether ketone)s, and poly(arylene ether sulfone)s are engineering polymers known for their chemical, thermal, and mechanical stability. Poly(arylene ether)s, poly(arylene ether ketone)s, and poly(arylene ether sulfone)s can be sulfonated to produce sulfonic-acid functionalized aromatic polymers. However, due to relatively poor control inherent in the process, post-polymerization sulfonation can result in sulfonation on the most electron-rich aromatic rings, essentially those substituted with just the ether functional groups, which are also the most activated due to subsequent thermal decomposition of the sulfonic acid groups.

Another method for producing sulfonic-acid functionalized aromatic polymers is by polymerizing sulfonated monomers, as disclosed, for example, by F. Wang et al., "Direct polymerization of sulfonated poly(arylene ether sulfone) random (statistical) copolymers: candidates for new proton exchange membranes", Journal of Membrane Science, Vol. 197 (1-2), pp. 231-242 (2002). This allows the sulfonic acid groups to be located on the most electron-deficient aromatic rings to improve their thermal stability. However, the proton conductivity of sulfonated aromatic polymers made by either of the two methods discussed hereinabove is limited by the acid strength of the aromatic sulfonic acid groups, especially at low relative humidity.

The use of fluorosulfonimide functional groups instead of sulfonic acid groups at similar equivalent weights can increase the proton conductivity of the resulting aromatic polymers because fluorosulfonimides possess higher acid strengths. M. Hofmann (U.S. Pat. No. 7,135,537) prepared aromatic polymers containing fluorosulfonimide functionalities in the backbone. However, all the polymers prepared also contained an ether functionality in the aromatic backbone, which decreases their stability. The higher acid strength of the fluorosulfonimide groups leads to thermal and chemical instability in the ether groups relative to comparable sulfonated aromatic polymers, and the flexibility of the ether groups increases the potential for excessive water uptake, which reduces their mechanical stability. In addition, electron-rich aromatic rings substituted with ether groups are more susceptible to chemical degradation under the oxidative conditions inherent in PEMFC, which are due, in part, to high permeability to the fuel cell reactants.

A need remains for polymers suitable for use in conductive membranes for applications such as fuel cells that exhibit good ionic conductivity, hydration, chemical, thermal, and mechanical stability at high temperatures, and low reactant permeability.

SUMMARY

Described herein is a polymer comprising repeating units of Formula (I):

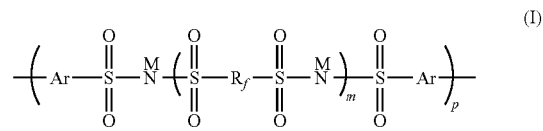

wherein Ar is a divalent group of Formula (II):

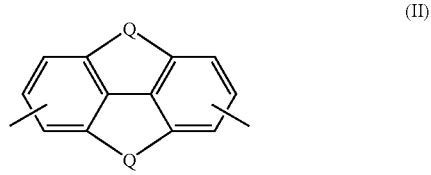

and is optionally substituted with one or more fluorine;

$R_f$ is a straight chain, branched or cyclic, perfluorinated alkylene group having from 1 to 20 carbon atoms and optionally substituted with one or more ether oxygens or halogens;

m is 1-6; p indicates the average number of monomeric units;

M is one or more of monovalent cation;

and Q is S, $SO_2$, CO, or $CR^1R^2$, wherein $R^1$ and $R^2$ are independently branched or cyclic perfluorinated alkyl groups having 1 to 10 carbon atoms, and wherein $R^1$ and $R^2$ can together form a ring.

The polymer can be formed into a membrane that can be used in an electrochemical cell.

Also described herein is a composition of Formula (VI):

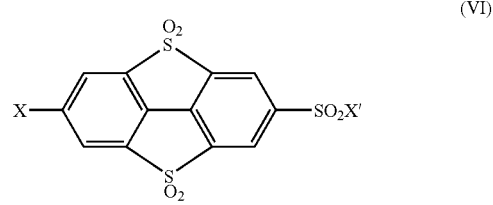

wherein X and X' are independently F, Cl, Br, I, methanesulfonate, or trifluoromethanesulfonate.

Also described herein is a composition of Formula (VII)

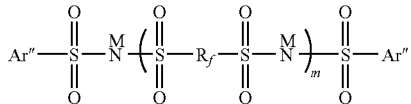

(VII)

wherein Ar" is a univalent group of Formula (VIII):

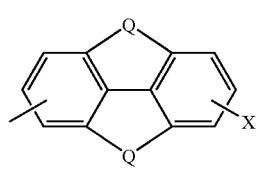

(VIII)

$R_f$ is a straight chain, branched or cyclic, perfluorinated alkylene group having from 1 to 20 carbon atoms and optionally substituted with one or more ether oxygens or halogens;

m is 1-6;

M is one or more of monovalent cation;

Q is S, $SO_2$, CO, or $CR^1R^2$, wherein $R^1$ and $R^2$ are independently branched or cyclic perfluorinated alkyl groups having 1 to 10 carbon atoms, and wherein $R^1$ and $R^2$ can together form a ring; and X is chlorine, bromine, iodine, methanesulfonate, or trifluoromethanesulfonate.

DETAILED DESCRIPTION

Disclosed herein is a composition of Formula (VI):

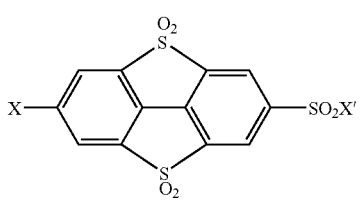

(VI)

wherein X and X' are independently F, Cl, Br, or I, methanesulfonate, or trifluoromethanesulfonate. These compositions can be useful in the synthesis of many compounds useful as monomers or grafting agents, particularly in the synthesis of polymers useful as cation-exchange resins.

One method to synthesize compounds of Formula (VI) can start with disulfonation of sulfanilic acid followed by conversion to a phenyl halide derivative using the Sandmeyer reaction, Ullmann coupling with a 1,4-dihalo-benzene to give a biphenyl compound, conversion of the sulfonate groups to sulfonyl halides, and cyclization of the sulfonyl halide groups adjacent to the neighboring phenyl ring to form sulfolane rings.

Also disclosed are compositions of Formula (VII):

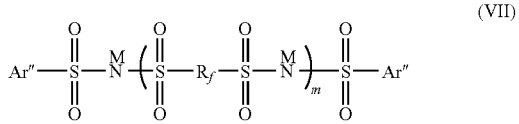

(VII)

wherein Ar" is a univalent group of Formula (VIII):

(VIII)

$R_f$ is a straight chain, branched or cyclic, perfluorinated alkylene group having from 1 to 20 carbon atoms and optionally substituted with one or more ether oxygens or halogens;

m is 1-6;

M is one or more of monovalent cation;

Q is S, $SO_2$, CO, or $CR^1R^2$, wherein $R^1$ and $R^2$ are independently branched or cyclic perfluorinated alkyl groups having 1 to 10 carbon atoms, and wherein $R^1$ and $R^2$ can together form a ring; and X is chlorine, bromine, iodine, methanesulfonate, or trifluoromethanesulfonate.

Ar" is a univalent group at any open valence of the rings, as indicated.

The monovalent cation M can be a single cation or a mixture of different cations. In one embodiment, the M is K, Na, Li, or H.

By "perfluorinated alkylene" it is meant a divalent group containing carbon and fluorine connected by single bonds, optionally substituted with ether oxygens or other halogens, and containing two free valences to different carbon atoms. It can be linear, branched, or cyclic. In one embodiment $R_f$ is a perfluorinated alkylene group having from 2 to 10 carbon atoms.

In one embodiment, Ar" is a univalent group of Formula (IX):

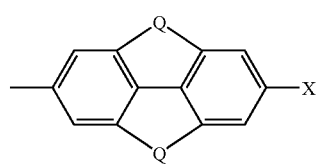

(IX)

One method to synthesize the compositions of Formula VII is to combine a fluorinated disulfonamide with two equivalents of a compound comprising the desired arylene backbone containing a halogen substituent and a sulfonyl halide substituent, such as those embodied by Formula (VI) described above. One method to prepare the disulfonamide is described in PCT Appl. 2005/001979, Example 1.

Described herein is a polymer comprising repeating units of Formula (I):

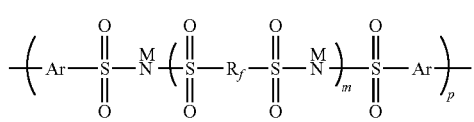

wherein Ar is a divalent group of Formula (II):

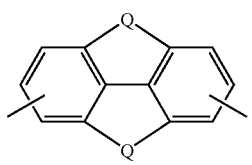

and is optionally substituted with one or more fluorine;

$R_f$ is a straight chain, branched or cyclic, perfluorinated alkylene group having from 1 to 20 carbon atoms and optionally substituted with one or more ether oxygens or halogens;

p indicates the average number of monomeric units;

m is 1-6;

M is one or more of monovalent cation;

and Q is S, $SO_2$, CO, or $CR^1R^2$, wherein $R^1$ and $R^2$ are independently branched or cyclic perfluorinated alkyl groups having 1 to 10 carbon atoms, and wherein $R^1$ and $R^2$ can together form a ring.

Ar is a divalent group at any open valence of the rings, as indicated.

The disclosed polymers can be useful as cation-exchange resins, useful in making proton-exchange membranes for electrochemical cells such as fuel cells and can be used in any application wherein cation-exchange capacity is desired. The polymers described herein can be either homopolymers or copolymers.

The term "copolymer" is intended to include oligomers and copolymers having two or more different repeating units. A copolymer having repeating units derived from a first monomer "X-A-X" and a second monomer "X—B—X" will have repeating units (-A-) and (—B—). The copolymers described herein can be random or block copolymers.

The practical upper limit to the number of monomeric units in the polymer is determined in part by the desired solubility of a polymer in a particular solvent or class of solvents. As the total number of monomeric units increases, the molecular weight of the polymer increases. The increase in molecular weight is generally expected to result in a reduced solubility of the polymer in a particular solvent. Moreover, in one embodiment, the number of monomeric units at which a polymer becomes substantially insoluble in a given solvent is dependent in part upon the structure of the monomer. In one embodiment, the number of monomeric units at which a copolymer becomes substantially insoluble in a given solvent is dependent in part upon the ratio of the comonomers. For example, a polymer composed of flexible monomers may become substantially insoluble in an organic solvent if the resulting polymer becomes too rigid in the course of polymerization. As another example, a copolymer composed of several monomers may become substantially insoluble in an organic solvent when ratio of rigid monomeric units to flexible monomeric units is too large. The selection of polymer molecular weight, polymer and copolymer composition, and a solvent is within the purview of one skilled in the art.

The monovalent cation M can be a single cation or a mixture of different cations. In one embodiment, the M is K, Na, Li, or H.

By "perfluorinated alkylene" it is meant a divalent group containing carbon and fluorine connected by single bonds, optionally substituted with ether oxygens or other halogens, and containing two free valences to different carbon atoms. It can be linear, branched, or cyclic. In one embodiment $R_f$ is a perfluorinated alkylene group having from 2 to 10 carbon atoms.

In one embodiment, Ar is a divalent group of Formula (IIa):

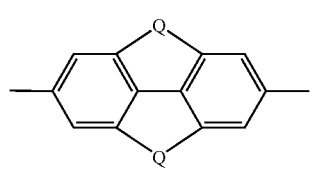

The monomers that can be used to prepare polymers of Formula (I), and the reactants used to prepare the monomers, may be obtained commercially or be prepared using any known method in the art or as described herein. Suitable monomers are those embodied by Formula (VII).

In another embodiment, the polymer is a copolymer and comprises repeating units of Formula (X):

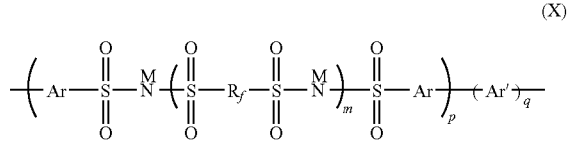

wherein Ar is a divalent group of Formula (II) and Ar' is a divalent group of Formula (II), (IV), or (V), or Ar is a divalent group of Formula (IV) and Ar' is at least one divalent group of Formula (II):

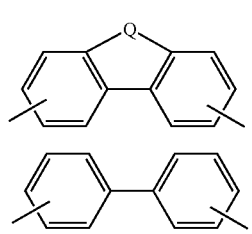

The monovalent cation M can be a single cation or a mixture of different cations. In one embodiment, the M is K, Na, Li, or H.

$R_f$ is a straight chain, branched or cyclic, perfluorinated alkylene group having from 1 to 20 carbon atoms and optionally substituted with one or more ether oxygens or halogens;

p and q indicate the average number of monomeric units for each block; and m is 1-6.

By "perfluorinated alkylene" it is meant a divalent group containing carbon and fluorine connected by single bonds, optionally substituted with ether oxygens or other halogens, and containing two free valences to different carbon atoms. It can be linear, branched, or cyclic. In one embodiment $R_f$ is a perfluorinated alkylene group having from 2 to 10 carbon atoms.

Methods to synthesis the monomers and the reactants for the polymer of Formula X when Ar is Formula IV are disclosed in co-owned and concurrently filed U.S. patent application Ser. No. 11/865,081.

In one embodiment Ar is a divalent group of Formula (IIa) and Ar' is at least one a divalent group of Formula (IIa), (IVa), or (Va), or Ar is a divalent group of Formula (IVa) and Ar' is a divalent group of Formula (IIa):

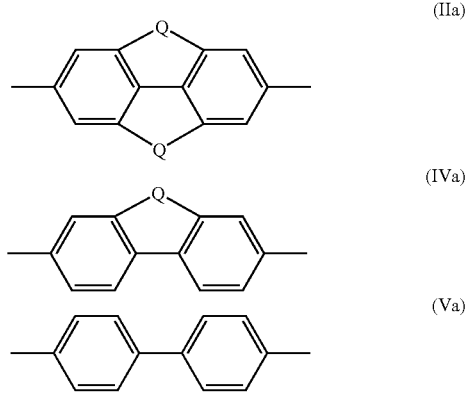

The polymers and copolymers as described herein can generally be prepared by synthetic routes in which the chlorine, bromine, iodine, methanesulfonate, or trifluoromethanesulfonate leaving groups of the monomers are eliminated in carbon-carbon bond-forming reactions. Such carbon-carbon bond-forming reactions are typically mediated by a zerovalent transition metal compound that contains neutral ligands. In one embodiment, the zerovalent transition metal compound contains nickel or palladium. The starting monomers may also be reacted to form larger monomeric units that are then polymerized alone or with other monomers. For example, a copolymer (-A-)x(-B-)y may be formed by copolymerizing monomer X-A-X with monomer X—B—X, or by forming larger monomer X-A-B—X and polymerizing that monomer. In both cases, the resulting polymer is considered a copolymer derived from monomer X-A-X and monomer X—B—X.

Neutral ligands are defined as ligands that are neutral, with respect to charge, when formally removed from the metal in their closed shell electronic state. Neutral ligands contain at least one lone pair of electrons, a pi-bond, or a sigma bond that is capable of binding to the transition metal. For the processes described here, the neutral ligand may also be a combination of two or more neutral ligands. Neutral ligands may also be polydentate when more than one neutral ligand is connected via a bond or a hydrocarbyl, substituted hydrocarbyl or a functional group tether. A neutral ligand may be a substituent of another metal complex, either the same or different, such that multiple complexes are bound together. Neutral ligands can include carbonyls, thiocarbonyls, carbenes, carbynes, allyls, alkenes, olefins, cyanides, nitriles, carbon monoxide, phosphorus containing compounds such as phosphides, phosphines, or phosphites, acetonitrile, tetrahydrofuran, tertiary amines (including heterocyclic amines), ethers, esters, phosphates, phosphine oxides, and amine oxides.

Three synthetic methods based on zerovalent transition metal compounds that can be used to prepare the polymers are described herein. In each method, the zerovalent transition metal compound that is the active species in carbon-carbon bond formation can be introduced directly into the reaction, or can be generated in situ under the reaction conditions from a precursor transition metal compound and one or more neutral ligands.

In a first synthetic method, as described in Yamamoto, Progress in Polymer Science, Vol. 17, p 1153 (1992), the dihalo derivatives of the monomers are reacted with stoichiometric amounts of a zerovalent nickel compound, such as a coordination compound like bis(1,5-cyclooctadiene)nickel (0), and a neutral ligand, such as triphenylphosphine or 2,2'-bipyridine. These components react to generate the zerovalent nickel compound that is the active species in the polymerization reaction. A second neutral ligand, such as 1,5-cyclooctadiene, can be used to stabilize the active zerovalent nickel compound.

In a second synthetic method, as described in U.S. Pat. No. 5,962,631, Ioyda et al., Bulletin of the Chemical Society of Japan, Vol. 63, p. 80 (1990), and Colon et al., Journal of Polymer Science, Part A, Polymer Chemistry Edition, Vol. 28, p. 367 (1990), the dihalo derivatives of the monomers are reacted with catalytic amounts of a divalent nickel compound in the presence of one or more neutral ligands in the presence of stoichiometric amounts of a material capable of reducing the divalent nickel ion to zerovalent nickel.

In the second synthetic method, the catalyst is formed from a divalent nickel salt. The nickel salt may be any nickel salt that can be converted to the zerovalent state under reaction conditions. Suitable nickel salts are the nickel halides, typically nickel dichloride or nickel dibromide, or coordination compounds, typically bis(triphenylphosphine)nickel dichloride or (2,2'-bipyridine)nickel dichloride. The divalent nickel salt is typically present in an amount of about 0.01 mole percent or greater, more typically about 0.1 mole percent or greater or 1.0 mole percent or greater. The amount of divalent nickel salt present is typically about 30 mole percent or less, more typically about 15 mole percent or less based on the amount of monomers present.

In the second synthetic method, the polymerization is performed in the presence of a material capable of reducing the divalent nickel ion to the zerovalent state. Suitable material includes any metal that is more easily oxidized than nickel. Suitable metals include zinc, magnesium, calcium and lithium, with zinc in the powder form being typical. At least stoichiometric amounts of reducing agent based on the monomers are required to maintain the nickel species in the zerovalent state throughout the reaction. Typically, about 150 mole percent or greater, more typically about 200 mole percent or greater, or about 250 mole percent or greater is used. The reducing agent is typically present in an amount of about 500 mole percent or less, about 400 mole percent or less, or about 300 mole percent or less based on the amount of monomer.

Also present in the second synthetic method are one or more compounds capable of acting as a ligand. Suitable ligands are neutral ligands as described above, and include trihydrocarbylphosphines. Typical ligands are monodentate, such as triaryl or trialkylphosphines like triphenylphosphine, or bidentate, such as 2,2'-bipyridine. A compound capable of acting as a monodentate ligand is typically present in an amount of from about 10 mole percent or greater, or about 20 mole percent or greater based on the monomer. A compound capable of acting as a monodentate ligand is typically present in an amount of about 100 mole percent or less, about 50 mole percent or less, or about 40 mole percent or less. A compound capable of acting as a bidentate ligand is typically present in an amount that is about a molar equivalent or greater based on the divalent nickel salt. Alternatively, the bidentate ligand can be incorporated into the nickel salt as a coordination compound as described above.

In a third synthetic method, as described in PCT application WO 00/53656 and U.S. Pat. No. 6,353,072, a dihalo derivative of one monomer is reacted with a derivative of another monomer having two leaving groups selected from boronic acid (—$B(OH_2)$), or boronate salt, boronic acid esters (—$BOR_2$) or (—$B(ORO)$)), and boranes (—$BR_2$), where R is generally a hydrocarbyl group, in the presence of a catalytic amount of a zerovalent palladium compound containing a neutral ligand as described above, such as tetrakis(triphenylphosphine)palladium(0). If the leaving group is a boronic ester or borane group, the reaction mixture should include sufficient water or an organic base to hydrolyze the boronic ester or borane group to the corresponding boronic acid group. The diboronic derivative of a monomer can be prepared from the dihalo derivative by known methods, such as those described in Miyaura et al., Synthetic Communication, Vol. 11, p. 513 (1981) and Wallow et al., American Chemical Society, Polymer Preprint, Vol. 34, (1), p. 1009 (1993).

All of the synthetic methods discussed herein can be performed in the presence of a compound capable of accelerating the reaction. Suitable accelerators include alkali metal halides such as sodium bromide, potassium bromide, sodium iodide, tetraethylammonium iodide, and potassium iodide. The accelerator is used in a sufficient amount to accelerate the reaction, typically 10 mole percent to 100 mole percent based on the monomer.

The reactions are typically run in a suitable solvent or mixture of solvents, that is a solvent that is not detrimental to catalyst, reactant and product, and preferably one is which the reactants and products are soluble. Suitable solvents include N,N-dimethylformamide (DMF), toluene, tetrahydrofuran (THF), acetone, anisole, acetonitrile, N,N-dimethylacetamide (DMAc), and N-methylpyrrolidinone (NMP). The amount of solvent used in this process can vary over a wide range. Generally, it is desired to use as little solvent as possible. The reactions are typically conducted in the absence of oxygen and moisture, as the presence of oxygen can be detrimental to the catalyst and the presence of a significant amount of water can lead to premature termination of the process. More typically, the reaction is performed under an inert atmosphere such as nitrogen or argon.

The reactions can be performed at any temperature at which the reaction proceeds at a reasonable rate and does not lead to degradation of the product or catalyst. Generally, the reaction is performed at a temperature of about 20° C. to about 200° C., more typically less than 100° C. The reaction time is dependent upon the reaction temperature, the amount of catalyst and the concentration of the reactants, and is usually about 1 hour to about 100 hours.

The polymers prepared by the disclosed methods can be recovered according to conventional techniques including filtration and precipitation using a non-solvent. They also can be dissolved or dispersed in a suitable solvent for further processing.

The polymers described herein can be formed into membranes using any conventional method such as but not limited to solution or dispersion film casting or extrusion techniques. The membrane thickness can be varied as desired for a particular application. Typically, for electrochemical uses, the membrane thickness is less than about 350 μm, more typically in the range of about 25 μm to about 175 μm. If desired, the membrane can be a laminate of two different polymers such as two polymers having different equivalent weight or other properties. Such films can be made by laminating two membranes. Alternatively, one or both of the laminate components can be cast from solution or dispersion. When the membrane is a laminate, the chemical identities of the monomer units in the additional polymer can independently be the same as or different from the identities of the analogous monomer units of the first polymer. One of ordinary skill in the art will understand that membranes prepared from the dispersions may have utility in packaging, in non-electrochemical membrane applications, as an adhesive or other functional layer in a multi-layer film or sheet structure, and other classic applications for polymer films and sheets that are outside the field of electrochemistry. For the purposes of the present invention, the term "membrane", a term of art in common use in electrochemistry, is synonymous with the terms "film" or "sheet", which are terms of art in more general usage, but refer to the same articles.

The membrane may optionally include a porous support or reinforcement for the purposes of improving mechanical properties, for decreasing cost and/or other reasons. The porous support may be made from a wide range of materials, such as but not limited to non-woven or woven fabrics, using various weaves such as the plain weave, basket weave, leno weave, or others. The porous support may be made from glass, hydrocarbon polymers such as polyolefins, (e.g., polyethylene, polypropylene, polybutylene, and copolymers), and perhalogenated polymers such as polychlorotrifluoroethylene. Porous inorganic or ceramic materials may also be used. For resistance to thermal and chemical degradation, the support typically is made from a fluoropolymer, more typically a perfluoropolymer. For example, the perfluoropolymer of the porous support can be a microporous film of polytetrafluoroethylene (PTFE) or a copolymer of tetrafluoroethylene. Microporous PTFE films and sheeting are known that are suitable for use as a support layer. For example, U.S. Pat. No. 3,664,915 discloses uniaxially stretched film having at least 40% voids. U.S. Pat. Nos. 3,953,566, 3,962,153 and 4,187,390 disclose porous PTFE films having at least 70% voids. Impregnation of expanded PTFE (ePTFE) with perfluorinated sulfonic acid polymer is disclosed in U.S. Pat. Nos. 5,547,551 and 6,110,333. ePTFE is available under the trade name "Goretex" from W. L. Gore and Associates, Inc., Elkton, Md., and under the trade name "Tetratex" from Tetratec, Feasterville, Pa.

Membrane electrode assemblies (MEA) and fuel cells therefrom are well known in the art and can comprise any of the membranes described above. One suitable embodiment is described herein. An ionomeric polymer membrane is used to form a MEA by combining it with a catalyst layer, comprising a catalyst such as platinum, which is unsupported or supported on carbon particles, a binder such as Nafion®, and a gas diffusion backing. The catalyst layers may be made from well-known electrically conductive, catalytically active particles or materials and may be made by methods well known in the art. The catalyst layer may be formed as a film of a polymer that serves as a binder for the catalyst particles. The binder polymer can be a hydrophobic polymer, a hydrophilic polymer, or a mixture of such polymers. The binder polymer is typically ionomeric and can be the same ionomer as in the membrane. A fuel cell is constructed from a single MEA or multiple MEAs stacked in series by further providing porous and electrically conductive anode and cathode gas diffusion backings, gaskets for sealing the edge of the MEA(s), which also provide an electrically insulating layer, graphite current collector blocks with flow fields for gas distribution, aluminum end blocks with tie rods to hold the fuel cell together, an anode inlet and outlet for fuel such as hydrogen, and a cathode gas inlet and an outlet for oxidant such as air.

EXAMPLES

The present invention is further defined in the following Examples. It should be understood that these Examples, while indicating preferred embodiments of the invention, are given by way of illustration only.

Materials and Methods

Anhydrous solvents are used for all synthetic reactions unless they are to be used in combination with water. Reagent-grade solvents are used for purifications and aqueous reactions. Synthetic reactions that are performed under anhydrous conditions are assembled in a glove box, which is purged with dry nitrogen, as described in the relevant Examples.

Abbreviations
DMSO dimethylsulfoxide
NMR nuclear magnetic resonance

Example 1

A mixture of sulfanilic acid and 30% fuming sulfuric acid can be heated under nitrogen to 180° C. to disulfonate the ring of the sulfanilic acid. The crude product can be isolated by quenching the mixture on ice, adding sodium chloride to precipitate the sodium salt, and filtering off the solids. The product can be recrystallized from water by addition of hydrochloric acid, collected by vacuum filtration, and dried to give 2-amino-benzene-1,3,5-trisulfonic acid, sodium salt.

The 2-amino-benzene-1,3,5-trisulfonic acid, sodium salt can be dissolved in water and treated with 48% hydrobromic acid (5 equivalents). A solution of sodium nitrite (2 equivalents) in water can be added dropwise and stirred until the precipitation of the diazonium salt is complete. A solution of cuprous bromide (1 equivalent) in 48% hydrobromic acid (5 equivalents) can be added in one portion and the mixture stirred until gas evolution ceases followed by heating to a reflux. The solution can be evaporated and the residue dissolved in water followed by neutralization to pH 7 using sodium bicarbonate. The solids can be filtered off, the filtrate evaporated, and the solids dried under vacuum. The product can be recrystallized from water by addition of ethanol to give 2-bromo-benzene-1,3,5-trisulfonic acid, sodium salt.

A solution of 2-bromo-benzene-1,3,5-trisulfonic acid, sodium salt and 1-bromo-4-iodo-benzene (1 equivalent) in DMAc can be treated with activated copper bronze (2.2 equivalents) and 2,2'-bipyridine (0.2 equivalents) then heated to 80° C. for 4 hours. The cooled mixture can be poured into water, the solids filtered off, and the filtrate evaporated and then dried under vacuum. The crude product can be isolated by extracting the solids with moist ethanol, filtering off the solids, and evaporating the filtrate to give 4'-bromo-biphenyl-2,4,6-trisulfonic acid, sodium salt.

A mixture of 4'-bromo-biphenyl-2,4,6-trisulfonic acid, sodium salt, thionyl chloride, and chlorosulfonic acid can be heated to a reflux overnight to form the sulfonyl chloride groups and cyclize them to form the sulfolane rings, which gives the fused ring heterocyclic nucleus that is referred to herein by the trivial name, dibenzodisulfolane. The crude product can be isolated by evaporating the solvent, washing the residue with water, collecting by vacuum filtration, and drying under vacuum. The product can be recrystallized from a suitable solvent, such as chloroform or toluene, to give 6-bromo-dibenzodisulfolane-2-sulfonyl chloride, shown below.

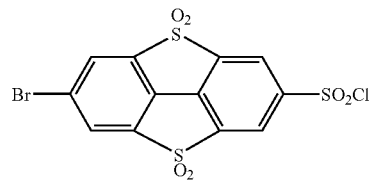

Example 2

Inside a glove box, a round-bottom flask equipped with a reflux condenser, stirring bar, and septum can be charged with 6-bromo-dibenzodisulfolane-2-sulfonyl chloride (2 equivalents), octafluorobutane-1,4-disulfonamide (1 equivalent), and acetonitrile followed by dropwise addition of triethylamine (4 equivalents). The solution can be heated to a reflux overnight under nitrogen, cooled to room temperature, and poured into an aqueous solution of sodium hydroxide (5 equivalents). The solvents can be evaporated and the solid residue dried under vacuum. The solids can be recrystallized from water. The crystals can then be collected by filtration, washed with water, and dried to give N,N'-bis(6-bromo-dibenzodisulfolane-2-sulfonyl)-octafluorobutane-1,4-disulfonamide, disodium salt, shown below. The salt can be rendered anhydrous for polymerization by drying at >150° C. in a vacuum oven under nitrogen purge.

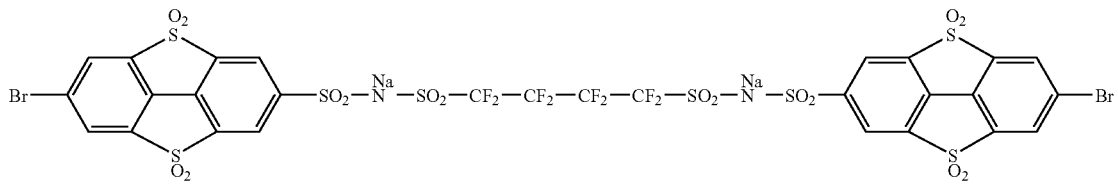

Example 3

Inside the glove box, a round-bottom flask equipped with a stirring bar and a septum can be charged with bis(1,5-cyclooctadiene)nickel(0) (2.02 equivalents), cyclooctadiene (2.02 equivalents), 2,2'-bipyridine (2.02 equivalents), and DMF, then heated to 70° C. under nitrogen for 30 minutes to give a dark violet-colored solution. Inside a glove box, a round-bottom flask equipped with a stirring bar and septum can be charged with N,N'-bis(6-bromo-dibenzodisulfolane- 2-sulfonyl)-octafluorobutane-1,4-disulfonamide, disodium salt (1 equivalent) and DMF, then heated to 70° C. under nitrogen. This solution can be added by cannula to the reaction flask under nitrogen and maintained at 70° C. overnight. The reaction mixture can be poured into concentrated hydrochloric acid in a blender to precipitate the polymer and disperse it into particles. The polymer can be collected by vacuum filtration, washed several times with hydrochloric acid followed by water and cyclohexane, aspirated until damp-dry, and dried in a heated vacuum oven under nitrogen purge to give poly(bis-dibenzdisulfolane-sulfonimide-1,4-octafluorobutane-sulfonimide), shown below.

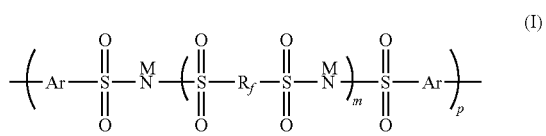

The polymer can be dissolved in a suitable solvent, such as DMF, DMSO, or NMP, using heat if needed. The solution can be filtered through a glass microfiber filter and a 5 μm PTFE membrane filter fitted to a stainless steel filter body using nitrogen pressure. Membranes can be cast from the polymer solution by weighing sufficient amounts of the solution into smooth, flat-bottomed dishes and drying on a level drying stage in a heated vacuum oven under nitrogen purge. The membranes can be freed by soaking in deionized water and treated twice by soaking in 15% nitric acid to extract residual salts and organic impurities followed by washing in deionized water until neutral.

What is claimed is:

1. A polymer comprising repeating units of Formula (I):

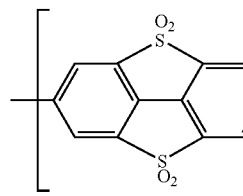

(I)

wherein Ar is a divalent group of Formula (II):

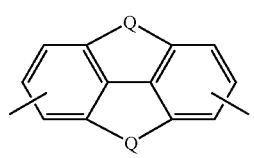

(II)

and is optionally substituted with one or more fluorine;

$R_f$ is a straight chain, branched or cyclic, perfluorinated alkylene group having from 1 to 20 carbon atoms and optionally substituted with one or more ether oxygens or halogens;

m is 1-6;

p is the number of monomeric units;

M is one or more of monovalent cation;

and Q is S, $SO_2$, CO, or $CR^1R^2$, wherein $R^1$ and $R^2$ are independently branched or cyclic perfluorinated alkyl groups having 1 to 10 carbon atoms, and wherein $R^1$ and $R^2$ can together form a ring.

2. The polymer of claim 1 wherein M is K, Na, Li, or H.

3. The polymer of claim 1 wherein $R_f$ is a perfluorinated alkylene group having from 2 to 10 carbon atoms.

4. The polymer of claim 3 wherein $R_f$ is a linear, perfluorinated alkylene group having from 2 to 4 carbon atoms.

5. The polymer of claim 1 wherein Ar is a divalent group of Formula (IIa):

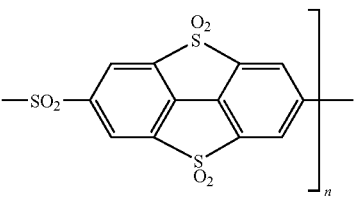

(IIa)

6. The polymer of claim 1 wherein m is 1.
7. The polymer of claim 1 wherein Q is $SO_2$.
8. A membrane made from the polymer of claim 1.
9. An electrochemical cell comprising the polymer of claim 1.
10. A fuel cell comprising the electrochemical cell of claim 9.
11. A polymer comprising repeating units of Formula (X):

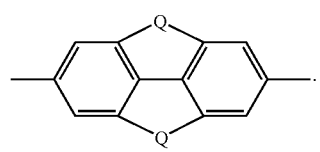

(X)

wherein:

p and q are the number of monomeric units in each block;

Ar is a divalent group of Formula (II) and Ar' is at least one divalent group of Formula (II), (IV), or (V):

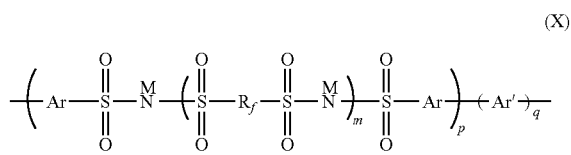

(IV)

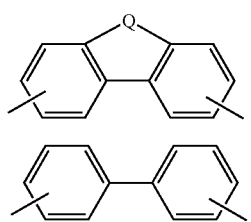

(V)

or Ar is a divalent group of Formula (IV) and Ar' is a divalent group of Formula (II).

12. The polymer of claim 11 wherein M is K, Na, Li, or H.

13. The polymer of claim 11 wherein $R_f$ is a perfluorinated alkylene group having from 2 to 10 carbon atoms.

14. The polymer of claim 11 wherein Ar is a divalent group of Formula (IIa) and Ar' is a divalent group of Formula (IIa), (IVa), or (Va):

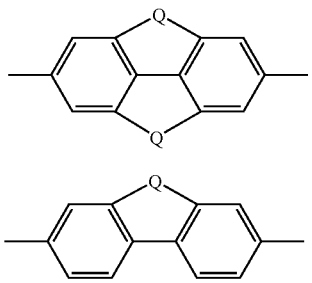

(IIa)

(IVa)

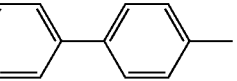

(Va)

or Ar is a divalent group of Formula (IVa) and Ar' is a divalent group of Formula (IIa).

15. The polymer of claim 11 wherein m is 1.

16. The polymer of claim 11 wherein Q is $SO_2$.

17. A membrane made from the polymer of claim 11.

18. An electrochemical cell comprising the polymer of claim 11.

19. A fuel cell comprising the electrochemical cell of claim 18.

* * * * *